(12) United States Patent
Wilson et al.

(10) Patent No.: US 8,808,934 B2
(45) Date of Patent: Aug. 19, 2014

(54) LOW POWER CONTROL OF FUEL CELL OPEN CIRCUIT VOLTAGE

(75) Inventors: Matthew P. Wilson, Groton, CT (US); Venkateshwarlu Yadha, Dallas, TX (US); Carl A. Reiser, Stonington, CT (US)

(73) Assignee: Ballard Power Systems Inc., Burnaby (CA)

( * ) Notice: Subject to any disclaimer, the term of this patent is extended or adjusted under 35 U.S.C. 154(b) by 487 days.

(21) Appl. No.: 12/998,152

(22) PCT Filed: Oct. 3, 2008

(86) PCT No.: PCT/US2008/011460
§ 371 (c)(1),
(2), (4) Date: Mar. 23, 2011

(87) PCT Pub. No.: WO2010/039109
PCT Pub. Date: Apr. 8, 2010

(65) Prior Publication Data
US 2011/0171547 A1    Jul. 14, 2011

(51) Int. Cl.
*H01M 8/04* (2006.01)

(52) U.S. Cl.
CPC ...... *H01M 8/04626* (2013.01); *H01M 8/04753* (2013.01); *H01M 8/04873* (2013.01); *Y02T 90/32* (2013.01); *H01M 8/04761* (2013.01); *H01M 2250/20* (2013.01); *H01M 8/04552* (2013.01); *Y02E 60/50* (2013.01); *Y02T 10/92* (2013.01); *H01M 8/04947* (2013.01)
USPC .......................................... 429/427

(58) Field of Classification Search
None
See application file for complete search history.

(56) References Cited

U.S. PATENT DOCUMENTS

| | | | |
|---|---|---|---|
| 4,202,933 A * | 5/1980 | Reiser et al. .................. | 429/432 |
| 6,635,370 B2 * | 10/2003 | Condit et al. ................. | 429/415 |
| 6,841,278 B2 | 1/2005 | Reiser et al. | |
| 2004/0053089 A1 | 3/2004 | Balliet et al. | |
| 2006/0093880 A1 * | 5/2006 | Igarashi et al. ................. | 429/22 |
| 2007/0077459 A1 * | 4/2007 | Walton et al. .................. | 429/12 |
| 2007/0154752 A1 | 7/2007 | McElroy et al. | |
| 2008/0057373 A1 * | 3/2008 | Breault et al. .................. | 429/34 |
| 2009/0087702 A1 * | 4/2009 | Yonekura et al. ............... | 429/13 |

* cited by examiner

*Primary Examiner* — Patrick Ryan
*Assistant Examiner* — Wyatt McConnell
(74) *Attorney, Agent, or Firm* — Seed IP Law Group PLLC

(57) ABSTRACT

A fuel cell power plant (5) includes a stack (6) of fuel cells, each of which have an anode (9), a cathode (10), and a PEM (11) disposed between the anode and the cathode. A controller (17) recognizes an indication (67) of no load demand (68) by a load (59), to operate (45) an air recycle loop (44-46) utilizing the process air blower (35) and transfer the power output (57) of the stack from the load (59) to an auxiliary load (60), comprising a resistance which will consume a predetermined small amount of power in response to the current applied thereto, when the stack operates at a critical voltage above which fuel cell corrosion is unacceptable. Fuel and air will also be reduced (16, 40). The controller may cause increased cathode recycle when the critical voltage is reached and increased air when the voltage is a fraction of a volt below the critical voltage.

10 Claims, 2 Drawing Sheets

LOW POWER CONTROL OF FUEL CELL OPEN CIRCUIT VOLTAGE

TECHNICAL FIELD

Using a pre-selected auxiliary load which will consume minimal power with the fuel cells operating at a critical voltage level, above which fuel cell deterioration may occur, the amounts of fresh air and cathode exhaust recycle gas are adjusted to maintain the voltage of the fuel cells within a small range below the critical voltage.

BACKGROUND ART

U.S. Pat. No. 4,202,933, to Reiser and Landau, describes that operation of fuel cell power plants at lower power levels causes high cell voltages which result in corrosion of catalysts and catalyst-support-material. This causes severe performance decay at low power operation. In vehicles for which the demand for power frequently is zero, recurrent, low power idling of the power plant will cause increasing performance decay over time.

The aforesaid patent further points out that just reducing the air input to the cathodes results in a severe current density maldistribution in each of the fuel cells. That is, the current density near the air inlets of the fuel cells is very high but the current density near air outlets is very low. This results in excessive heating at the air inlet regions of the fuel cells which can cause additional performance loss and possible fracture of fuel cell components.

In the aforesaid patent, cathode exhaust is recycled to the cathode air inlets in order to reduce power generated while at the same time controlling, at least to some extent, the voltage which is reached in the individual cells. This reduces current density maldistribution and corrosion. In the aforesaid patent, the desired power output is provided for comparison with actual power output; if the actual power is greater than the desired power, cathode recycle is used to cause a voltage drop; power conditioning apparatus reduces the actual power output. This can continue until either the desired power output level or the critical voltage is reached.

The problem with that method is that as much as 20 kilowatts may have to be generated in order to keep the voltage below the critical level. Although that power may be used for charging batteries or for running auxiliary equipment, it will in many instances simply have to be dissipated as heat, which can be a very difficult problem, particularly in a vehicle.

U.S. Pat. No. 4,859,545, to Scheffler and Vartanian, utilizes an algorithm involving oxygen concentration at the cathode exhaust, oxygen molar consumption rates at the present current output, and gas flow into the cathode, to control air utilization to ensure against individual cell oxygen starvation. The air inlet valve is adjusted upwardly or downwardly to achieve the desired air utilization. The manner of dealing with the output power is not disclosed.

SUMMARY

To control the voltage of fuel cells when a fuel cell stack is operating at low power levels, the stack is connected to a predetermined resistive auxiliary load, the size of which will dissipate the amount of power related to the current flow which will exist when the voltage is just below the critical value, above which corrosion of the catalyst and/or catalyst-support-material corrodes. Cathode recycle and inlet air flow are adjusted to establish the required voltage by reducing the available oxygen while maintaining an adequate flow through the cathodes so as to avoid current density maldistribution. The air inlet flow rate and cathode recycle flow rate can be adjusted by valves, orifices, or blower speed. As an example, in a typical fuel cell power plant, the auxiliary resistive load utilized at low power levels would need to dissipate on the order of one-half watt per cell. For a 100 kilowatt power plant, this would be about 500 watts. The resultant heat could be dissipated using the active power plant thermal management system or it may be transferred from ambient in a passive manner, such as radiation and/or convection.

Other variations will become more apparent in the light of the following detailed description of exemplary embodiments, as illustrated in the accompanying drawings.

MODES(S) OF IMPLEMENTATION

Figure 1:
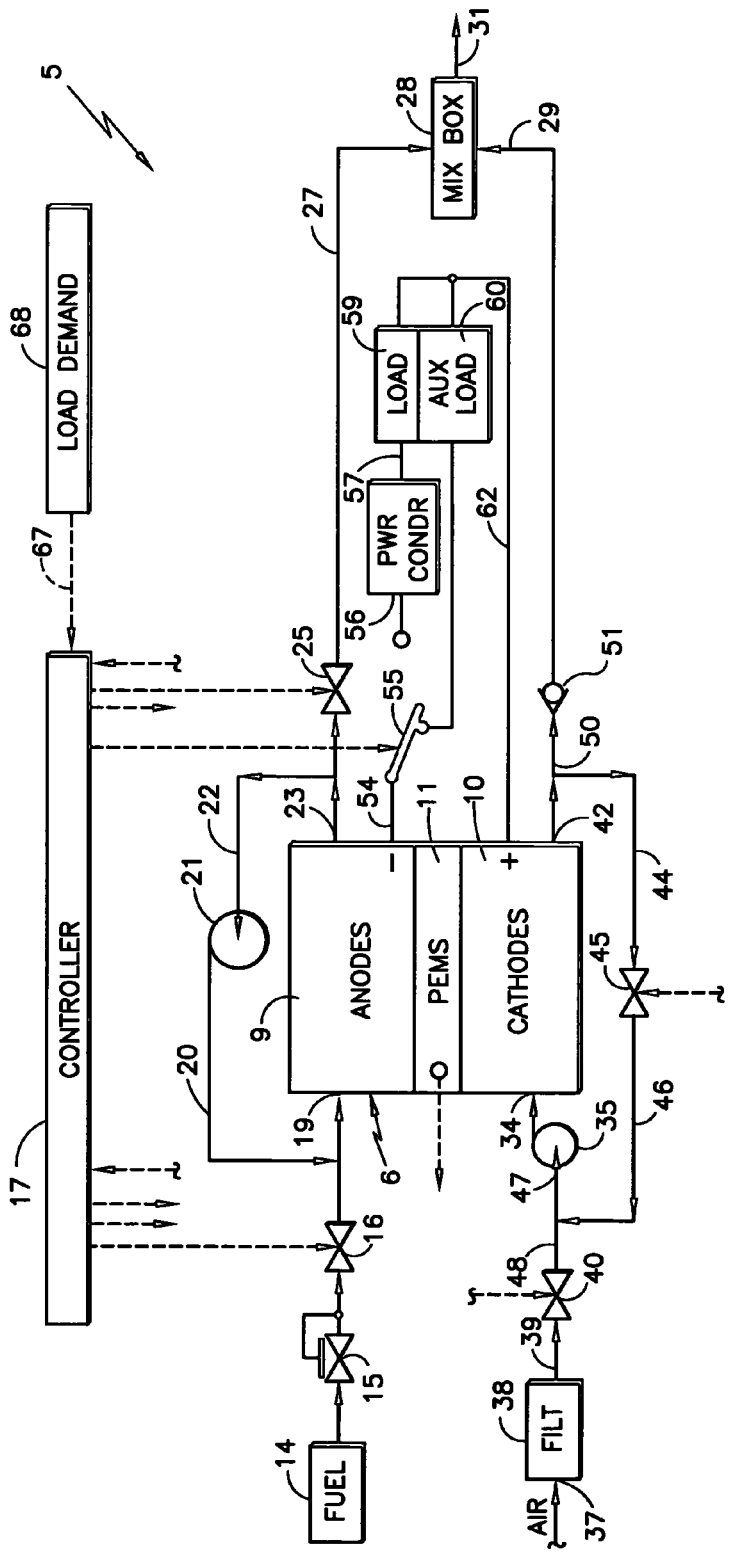
FIG. 1 is a simplified, schematic diagram of a fuel cell power plant which has a switchable auxiliary load and cathode recycle, useful in the low power control of open circuit voltage.

Referring to FIG. 1, a fuel cell power plant 5 includes a stack of fuel cells 6, each fuel cell having an anode catalyst layer, a cathode catalyst layer and a proton exchange membrane disposed between said layers. Each fuel cell also has fuel reactant gas flow field channels adjacent the anode catalyst layer, with or without an additional layer between the fuel flow field channels and the catalyst layer. Each fuel cell also has oxidant reactant gas flow field channels adjacent the cathode catalyst layer, with or without an additional layer between the oxidant reactant gas flow field channels and the cathode catalyst layer. These are known and are not shown in the drawing.

The anodes 9 and cathodes 10 are separated by proton exchange membranes 11. The anodes 9 receive fuel from a source 14 which passes through a pressure regulator 15 and a flow control valve 16, which is adjusted by a controller 17. The fuel inlets 19 of the anodes also receive recycle fuel in a conduit 20 from a recycle pump 21 that is connected by a conduit 22 to the anode fuel outlets 23. The controller 17 also operates a purge valve 25 to periodically or continuously release a small portion of the anode exhaust in order to rid the fuel cells of contaminants and inerts such as nitrogen. The valve 25 is connected by a conduit 27 to a mix box 28 where the anode exhaust is mixed with cathode exhaust in a conduit 29. The outflow of the mix box in a conduit 31 may be to ambient or to a controlled confinement of some sort.

The cathodes 10 receive air at inlets 34 from an air blower 35. Air is applied to the input 37 of a filter 38, the output of which in the conduit 39 is passed through an air control valve 40 that is regulated by the controller 17. The cathode outlets 42 are connected through a recycle conduit 44, a valve 45 and a conduit 46 to the inlet 47 of the air blower 35, which is also connected to the valve 40 by a conduit 48. The recycle control valve 45 is operated by the controller 17 so as to control the amount, if any, of recycle air which is returned over a conduit 46 to the inlet 47 of the blower 35 and the cathode air inlets 34.

The cathode outlets 42 are also connected by a conduit 50 through a check valve 51 to the conduit 29 to provide cathode exhaust to the mix box 28, thereby diluting any hydrogen which may remain in the anode exhaust before the mix box releases it in the conduit 31.

As an example, in the embodiment disclosed, the fuel cell stack electrical power output 54 from the anode end of the stack indicated by a minus sign, is connected through a switch 55 to a conventional power conditioner 56, which is shown only schematically in the drawing. The output 57 of the power conditioner 56 is connected to an actual load 59, which may be a vehicle or other electrical utilization apparatus. The switch is shown connected to an auxiliary load 60, such as that described hereinbefore with respect to low power control of fuel cell open circuit voltage. As shown schematically in the drawing, the loads are connected by a return line 62 to the cathode end of the stack indicated by a plus sign.

In the embodiment herein, the low power control of fuel cell open circuit voltage is described as it might be utilized with a vehicle, particularly a vehicle which has significant repetition of periods of no power demand, such as a bus that will idle during slow downs or stops for traffic or for service to passengers.

In the embodiment described herein, a signal 67 indicative of the electrical load demanded by the utilization apparatus, such as a vehicle acceleration pedal 68, or a composite load demand signal indicative of a variety of conditions in the electrical utilization apparatus, indicates to the controller the power which the fuel cell stack is required to provide to the load 59. If the signal 67 indicates that substantially no load demand is being made (such as a vehicle at idle), the controller will operate the switch 55 to connect the output of the fuel cell stack to the auxiliary load 60. But when power is being demanded as indicated by the signal 67, the controller will cause the switch 55 to connect the electrical output of the stack to the load 59.

Figure 2:
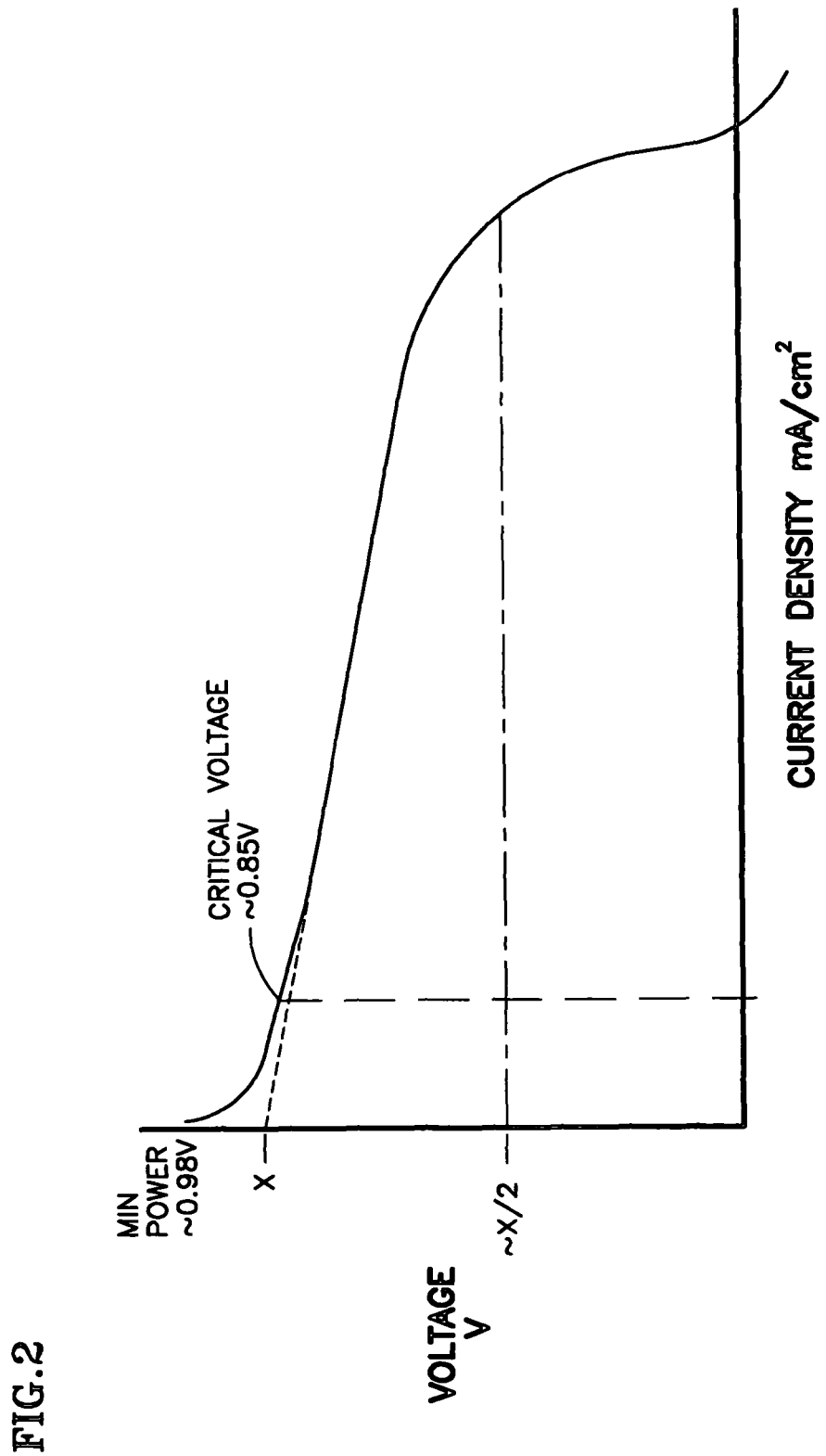
FIG. 2 is an exemplary performance curve of a fuel cell.

FIG. 2 is a rough illustration of a performance curve of a fuel cell, or of a stack of fuel cells, as the case may be. At any power level, there will be a voltage which is related to the current density by the performance curve. In FIG. 2, the dash-dot line indicates a position on the performance curve (X/2) which may be near maximum power output. Maximum power is at about one-half the voltage (X) of a straight line extension (dotted line) of the straight portion of the performance curve. A position on the performance curve indicative of a minimum power output, such as at idle, is at about 0.98 volts. The lower the current density, the higher the voltage. The control of fuel cell open circuit voltage is to assure that the voltage will go no higher than the critical voltage, indicated in FIG. 2 above the dashed line as about 0.85 volts, above which corrosion and performance decay may occur.

The auxiliary load 60 is selected so that at a power dissipation level which has been selected, the current in the auxiliary load will be that which relates to the current density on the performance curve (FIG. 2) at which the voltage is below the critical voltage, by some margin (such as a few hundreds of a volt). In a typical case, 850 millivolts is a likely critical voltage. Thus, the controller may be configured to cause the voltage, during low power demand, to remain within a small range of voltages, such as between 830 millivolts and 890 millivolts. This provides the desired low power output at the same time as assuring that the critical voltage will not be exceeded.

When the signal 67 indicates substantially no demand (zero or nearly zero power), such as vehicle idle, with the switch 55 transferred to the auxiliary load 60, the fuel and air input to the stack will both be reduced by adjustment of the valves 16, 40 and the cathode recycle valve 45 will be opened causing cathode recycle flow which results in a large flow of cathode gas with a low oxygen content. The lower oxygen content causes a lower current density with only insignificant current maldistribution in the fuel cells.

In one embodiment, the valve 45 can be opened completely by the controller 17 and left open during the period of low power demand. In such a case, control over the actual voltage will reside in the valve 40 controlling the amount of fresh air being provided to the cathodes. If the voltage is too high, the valve 40 will be closed by some increment, most likely iteratively, until the voltage reaches the lower voltage limit. Then the valve may be opened by an increment or several until the voltage reaches the upper limit. In other embodiments, the valve 40 may be adjusted until the voltage is within the limits, and then no longer be adjusted unless the voltage reaches one of the limits.

The valve 45 may also be a metering valve which is continuously controlled by the controller 17. In such a case, the controller will operate in accordance with a predetermined schedule to employ the present low power control of fuel cell open circuit voltage, which can be determined empirically for any particular fuel cell power plant 10. Such a schedule will be established in a fashion so that flow of gas through the cathodes will be maintained at a sufficient lower threshold level while at the same time the voltage will be controlled to be below the critical level. This will utilize cathode recycle, possibly including the maximum possible recycle flow, while providing the remaining amount of required flow by control of the inlet air at the valve 40.

Since increased recycle flow will reduce the voltage and increased air flow will increase the voltage, the voltage can be controlled by increasing air flow until the critical voltage is reached and then increasing recycle until a second voltage, which is some fraction of a volt below the critical voltage, is reached. Or, either of them could be adjusted until the voltage is between the critical voltage and the second voltage, and then no other adjustments made until the voltage changes and requires adjustment.

The invention claimed is:

1. A method for a proton exchange membrane fuel cell power plant (5) configured to provide power output (57) (a) to a stationary load or (b) as motive power to a vehicle (59), said method characterized by:

in response to an idle signal provided by the load indicating a change from substantial power being demanded (68) by the load to nearly zero power being demanded by the load—

(a) disconnecting the power output (57) of the power plant from the stationary load or the vehicle (59) and connecting a predetermined fixed resistive load (60) to the power output in place of the stationary load or the vehicle, said resistive load configured to dissipate a predetermined small fraction of fuel cell stack maximum power when the stack applies a predetermined critical voltage to the resistive load, below which fuel cell corrosion is not excessive;

(b) monitoring the voltage of at least one fuel cell of the power plant;

(c) reducing (40) the amount of air supplied to said air inlets; and (d) recycling cathode exhaust gas (42) of fuel cells of said power plant to air inlets (34) of said fuel cells in an amount to limit the voltage of the at least one cell to less than said critical voltage.

2. A method according to claim 1 further characterized in that, after step (d), the inlet air (48) is adjusted (40) to be the highest that it can be while limiting the voltage to the critical voltage by adjustment of the amount of cathode exhaust gas that is recycled.

3. A method according to claim 2 further characterized in that when the voltage of the at least one cell reaches the critical voltage, less air and more recycled cathode exhaust are provided to the air inlets, and when the voltage of the at least one cell is reduced to a second voltage, which is a small fraction of a volt lower than the critical voltage, more air and less recycled cathode exhaust are provided to the air inlets.

4. A method according to claim 3 further characterized in that the critical voltage is between about 0.85 volts and about 0.89 volts, and the second voltage is between about 0.83 volts and about 0.85 volts.

5. A method according to claim 3 further characterized in that the critical voltage is about 0.85 volts and the second voltage is about 0.83 volts.

6. A fuel cell power plant (5) configured to provide electric power (i) to a vehicular output load or (ii) to a stationary output load; said power plant comprising:
  a stack of fuel cells (6), each fuel cell comprising—
  a membrane electrode assembly having an anode catalyst layer and a cathode catalyst layer with a proton exchange membrane disposed between the layers;
  a porous, hydrophilic, anode water transport plate having fuel flow field channels disposed adjacent the anode catalyst layer, with or without an additional layer between the anode water transport plate and the anode catalyst layer;
  a porous, hydrophilic, cathode water transport plate having oxidant flow field channels disposed adjacent the cathode catalyst layer, with or without an additional layer between the cathode water transport plate and the cathode catalyst layer;
  said power plant further comprising:
  a controller (17);
  a source of fuel (14) connected through a controllable fuel valve (16) to inlets of the fuel flow field channels;
  an air source (40), including an air blower (35) configured to provide a controllable amount of air to air inlets (34) of the oxidant flow field channels (10);
  a selectively operable recycle loop (44-46), including either the air blower (35) or an air recycle blower, configured to respond to the controller to recycle a controllable amount of oxidant flow field exhaust to the inlets of the oxidant flow fields;
  characterized by:
  a resistive load (60) selected to dissipate a predetermined small fraction of fuel cell stack maximum power when the stack applies a predetermined critical voltage, below which fuel cell corrosion is not excessive, to the resistive load; and
  a controllable switch (55) configured to alternatively connect the electric output of said stack to the output load or to the resistive load;
  said output load configured to provide an indication (67) of power demand (68) to the controller;
  the controller, in response to an indication (67) of substantially no power demand, configured to (a) reduce the amount of fuel provided to the fuel inlets, (b) position the switch to connect the stack to the resistive load, (c) reduce the air provided to the air inlets, and (d) cause the recycle loop (44-46) to recycle a controlled amount of oxidant flow field exhaust (42) to the air inlets (34) in an amount to limit fuel cell voltage to said predetermined critical voltage, said controller, in response to an indication of power demand, configured to (e) position the switch to connect the stack to the output load, (f) disable the recycle loop, (g) increase the amount of fuel provided to said fuel inlets, and (h) increase the air provided to the air inlets.

7. A fuel cell power plant (5) according to claim 6 further characterized in that the controller (17) is configured, when the voltage of the at least one cell reaches the critical voltage, to cause the air source (40) and the recycle loop (44-46) to provide less air and more cathode exhaust to the air inlets, and the controller is configured, when the voltage of the at least one cell decreases to a second voltage which is a fraction of a volt lower than the critical voltage, to cause the air source and the recycle loop to provide more air and less cathode exhaust to the air inlets.

8. A fuel cell power plant (5) according to claim 7 further characterized in that the controller (17) is configured to set the critical voltage at about 0.85 volts and the second voltage at about 0.83 volts.

9. A fuel cell power plant (5) according to claim 7 further characterized in that the controller (17) is configured to set the critical voltage at between about 0.85 volts and about 0.89 volts, and the second voltage at between about 0.83 volts and about 0.85 volts.

10. A fuel cell power plant (5) according to claim 6 further characterized in that said fuel cell power plant is disposed in a vehicle which uses the electric power output of the fuel cell power plant as motive power.

\* \* \* \* \*